United States Patent
Vangala et al.

(10) Patent No.: US 11,558,894 B2
(45) Date of Patent: Jan. 17, 2023

(54) APERIODIC SCHEDULING OF UPLINK GRANTS IN A WIRELESS COMMUNICATION SYSTEM

(71) Applicant: Apple Inc., Cupertino, CA (US)

(72) Inventors: Sarma V. Vangala, San Jose, CA (US); Tarik Tabet, Los Gatos, CA (US); Rafael L. Rivera-Barreto, Santa Clara, CA (US); Swaminathan Balakrishnan, Santa Clara, CA (US); Samy Khay-Ibbat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/015,613

(22) Filed: Feb. 4, 2016

(65) Prior Publication Data

US 2016/0262178 A1 Sep. 8, 2016

Related U.S. Application Data (60) Provisional application No. 62/127,195, filed on Mar. 2, 2015.

(51) Int. Cl.
*H04W 72/14* (2009.01)
*H04W 72/12* (2009.01)

(52) U.S. Cl.
CPC ....... *H04W 72/14* (2013.01); *H04W 72/1268* (2013.01); *H04W 72/1289* (2013.01)

(58) Field of Classification Search
CPC ............. H04W 72/14; H04W 72/1268; H04W 72/1289

(Continued)

(56) References Cited

U.S. PATENT DOCUMENTS

| 8,934,498 B2 | 1/2015 | Kotecha |
| 9,131,457 B2 | 9/2015 | Nam et al. |

(Continued)

FOREIGN PATENT DOCUMENTS

| CN | 101615951 A | 12/2009 |
| CN | 102742194 A | 10/2012 |

(Continued)

OTHER PUBLICATIONS

Office Action, German Patent Application No. 10 2016 202 384.5, dated Oct. 23, 2018, six pages.

(Continued)

*Primary Examiner* — Charles N Appiah
*Assistant Examiner* — Nicole M Louis-Fils
(74) *Attorney, Agent, or Firm* — Kowert, Hood, Munyon, Rankin & Goetzel, P.C.

(57) ABSTRACT

Embodiments described herein relate to an apparatus, system, and method for providing aperiodic uplink grants to a UE for aperiodic communications from the UE to a base station. In some embodiments, the UE may be configured to communicate information to the base station, which may be useable by the base station to determine an uplink grant schedule for subsequent communications between the base station and the UE. This uplink grant schedule may be aperiodic, i.e., the uplink grants may be issued at non-uniform intervals of time. The UE may receive the uplink grants from the base station according to the uplink grant schedule. The UE may transmit uplink communications to the base station in response to the received uplink grants.

20 Claims, 7 Drawing Sheets

(58) Field of Classification Search
USPC .......................................... 455/455.1, 455.2
See application file for complete search history.

(56) References Cited

U.S. PATENT DOCUMENTS

| | | | |
|---|---|---|---|
| 9,137,755 B2 | 9/2015 | Malladi et al. | |
| 9,973,434 B2* | 5/2018 | Wakabayashi | H04W 52/0222 |
| 2003/0108059 A1* | 6/2003 | Yew | H04L 47/70 |
| | | | 370/443 |
| 2005/0036456 A1* | 2/2005 | Laroia | H04W 52/0216 |
| | | | 370/328 |
| 2008/0207150 A1* | 8/2008 | Malladi | H04W 52/08 |
| | | | 455/127.1 |
| 2009/0232084 A1* | 9/2009 | Li | H04L 5/0007 |
| | | | 370/330 |
| 2009/0238121 A1* | 9/2009 | Kotecha | H04L 1/0026 |
| | | | 370/329 |
| 2010/0135242 A1* | 6/2010 | Nam | H04L 5/0007 |
| | | | 370/330 |
| 2010/0189046 A1* | 7/2010 | Baker | H04W 72/08 |
| | | | 370/336 |
| 2010/0290411 A1* | 11/2010 | Kim | H04W 72/1289 |
| | | | 370/329 |
| 2012/0281566 A1* | 11/2012 | Pelletier | H04W 76/27 |
| | | | 370/252 |
| 2013/0010659 A1* | 1/2013 | Chen | H04L 5/001 |
| | | | 370/280 |
| 2013/0083766 A1* | 4/2013 | Chung | H04L 5/0053 |
| | | | 370/329 |
| 2013/0107817 A1* | 5/2013 | Yuan | H04W 72/1289 |
| | | | 370/329 |
| 2013/0182674 A1* | 7/2013 | Lunttila | H04L 5/001 |
| | | | 370/329 |
| 2013/0242726 A1* | 9/2013 | Zhu | H04L 67/02 |
| | | | 370/329 |
| 2013/0301500 A1* | 11/2013 | Koc | H04W 76/048 |
| | | | 370/311 |
| 2013/0322393 A1 | 12/2013 | Kishiyama | |
| 2014/0211767 A1* | 7/2014 | Lunttila | H04W 72/1289 |
| | | | 370/336 |
| 2014/0301288 A1* | 10/2014 | Koc | H04L 43/0823 |
| | | | 370/329 |
| 2015/0117342 A1* | 4/2015 | Loehr | H04W 72/1268 |
| | | | 370/329 |
| 2015/0282148 A1 | 10/2015 | Le | |
| 2016/0007350 A1 | 1/2016 | Xiong et al. | |
| 2016/0095137 A1* | 3/2016 | Chen | H04L 5/0007 |
| | | | 370/329 |
| 2016/0105905 A1* | 4/2016 | Vajapeyam | H04W 72/1263 |
| | | | 370/330 |
| 2016/0128095 A1* | 5/2016 | Damnjanovic | H04W 72/0446 |
| | | | 370/336 |
| 2016/0182286 A1* | 6/2016 | Lundén | H04L 47/245 |
| | | | 370/254 |

FOREIGN PATENT DOCUMENTS

| | | |
|---|---|---|
| CN | 103546411 A | 1/2014 |
| CN | 104349459 A | 2/2015 |
| WO | WO2010131932 A2 | 11/2010 |
| WO | WO 2015 023227 A1 | 2/2015 |

OTHER PUBLICATIONS

Office Action, Chinese Application for Invention No. 201610114619.4, dated Sep. 30, 2018, ** pages.

* cited by examiner

*SPS or delay Based Allocation*

FIG. 7A

*Aperiodic Pre-Determined Scheduling*

FIG. 7B

APERIODIC SCHEDULING OF UPLINK GRANTS IN A WIRELESS COMMUNICATION SYSTEM

PRIORITY CLAIM

The present application claims benefit of priority to provisional patent application 62/127,195 titled "Aperiodic Scheduling of Uplink Grants in a Wireless Communication System" filed on Mar. 2, 2015, which is hereby incorporated by reference in its entirety as though fully and completely set forth herein.

FIELD OF THE INVENTION

The present application relates to wireless devices, and more particularly to an apparatus, system, and method for a network to provide aperiodic uplink grants to a UE device.

DESCRIPTION OF THE RELATED ART

Wireless communication systems are rapidly growing in usage. Further, wireless communication technology has evolved from voice-only communications to also include the transmission of data, such as Internet and multimedia content.

In communications between a User Equipment (UE) device and a wireless network, a scheduling mechanism may be used to designate time slots for subsequent communications. For uplink communications, the UE typically receives an uplink grant from the base station, granting the UE permission to transmit uplink data. Current implementations of semi-persistent scheduling (SPS) and delay-based scheduling utilize a schedule of periodic uplink grants that are provided to the UE. However, for certain types of uplink traffic, periodic uplink grants may be inefficient. Many application categories, particularly applications running in the background, which may not demand constant or high-quality communications, may benefit from more efficient uplink grant scheduling mechanisms. Thus, improvements in the field are desired.

SUMMARY OF THE INVENTION

Embodiments described herein relate to an apparatus, system, and method for providing aperiodic uplink grants to a UE for aperiodic communications from the UE to a base station. In some embodiments, a UE may comprise at least one antenna, at least one transmitter, at least one receiver, and one or more processors coupled to the at least one transmitter and the at least one receiver. The UE may be configured to transmit information to the base station, which may be useable by the base station to determine an uplink grant schedule for subsequent communications between the base station and the UE. This uplink grant schedule may be aperiodic, i.e., the uplink grants may be issued at non-uniform intervals. The UE may receive the uplink grants from the base station according to the uplink grant schedule. The UE may transmit uplink communications to the base station in response to the received uplink grants. Alternatively, the base station may provide the aperiodic uplink grant schedule to the UE, and the UE may automatically initiate uplink communications at the times specified in the aperiodic uplink grant schedule, without the need to receive individual uplink grants from the base station.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present disclosure.

3GPP: Third Generation Partnership Project
3GPP2: Third Generation Partnership Project 2
C-DRX: Connected Mode Discontinuous Reception
GSM: Global System for Mobile Communications
UMTS: Universal Mobile Telecommunications System TDS: Time Division Synchronous Code Division Multiple Access LTE: Long Term Evolution RAT: Radio Access Technology SPS: Semi-Persistent Scheduling TX: Transmit RX: Receive Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine-grained (combinatorial logic or look up tables) to coarse-grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Aperiodic—The term "aperiodic" has the full breadth of its ordinary meaning, and describes, in the context of the issuance of uplink grants to a device, non-periodic issuance of such grants, i.e., the issuance of such grants at non-uniform time intervals.

Figure 1:
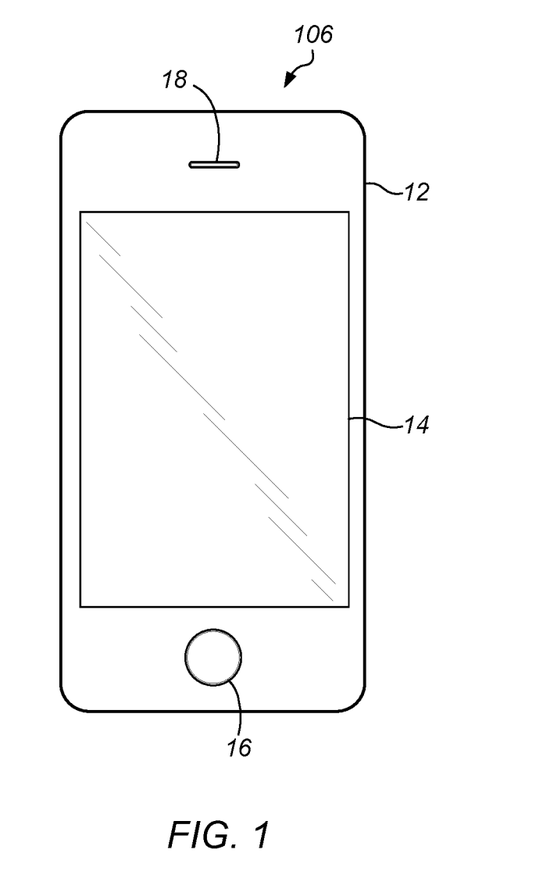
FIG. 1 illustrates an example user equipment (UE) according to some embodiments.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1XRTT or other CDMA radio access technologies), Time Division Synchronous Code Division Multiple Access (TD-SCDMA or TDS), Long Term Evolution (LTE), Advanced LTE, and/or other RATs. For example, the UE 106 may support three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

The UE 106 may comprise two antennas that may be used to communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain.

Figure 2:
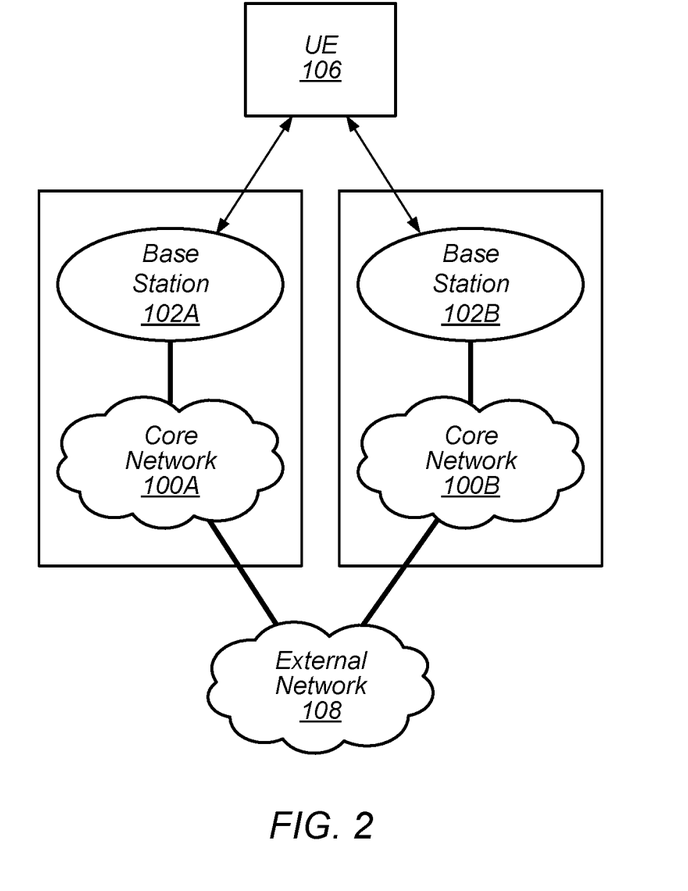
FIG. 2 illustrates an example wireless communication system wherein a UE communicates with two base stations using two different RATs, according to some embodiments.

FIG. 2—Communication System

FIG. 2 illustrates an example simplified wireless communication system. It is noted that the system of FIG. 2 is merely one example of a possible system, and embodiments may be implemented in any of various systems, as desired.

As shown, the example wireless communication system includes base stations 102A and 102B, which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit-switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the example network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In some embodiments, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN (WiFi), Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
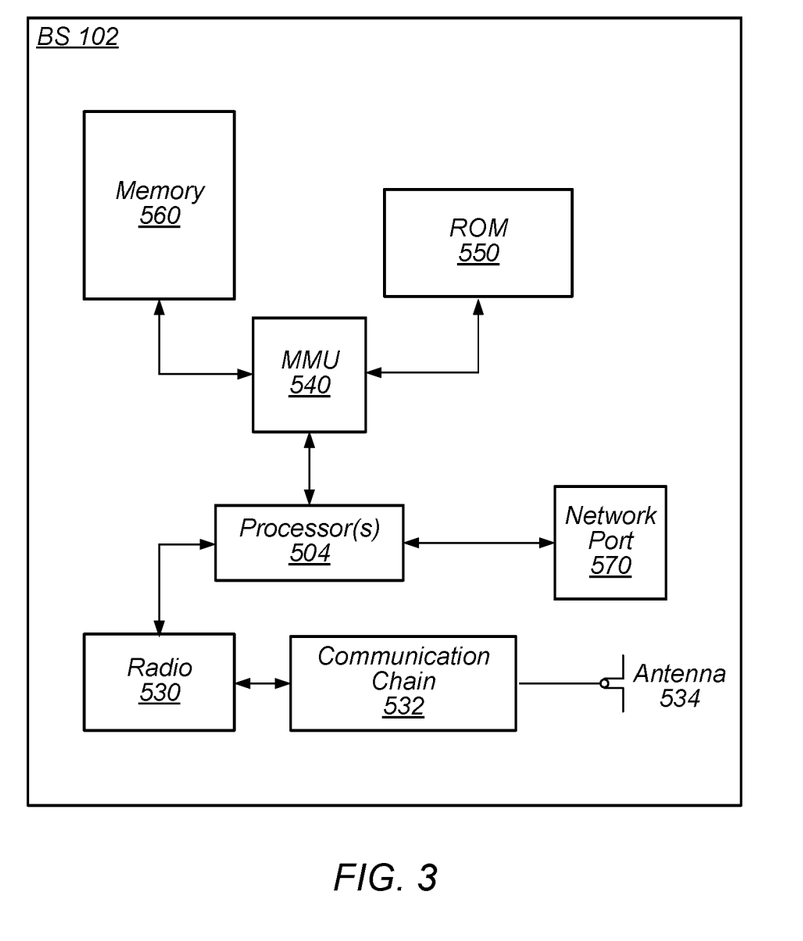
FIG. 3 is an example block diagram of a base station, according to some embodiments.

FIG. 3—Base Station

FIG. 3 illustrates an example block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also be configured to couple to a cellular network, e.g., a core network of a cellular service provider. The core network may provide mobility-related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, TDS, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. More specifically, the base station 102 may be configured to receive information from the UE and generate an aperiodic uplink grant schedule based on the received information. Alternatively, the base station may be configured to generate an aperiodic uplink grant schedule based on a packet inspection.

Figure 4:
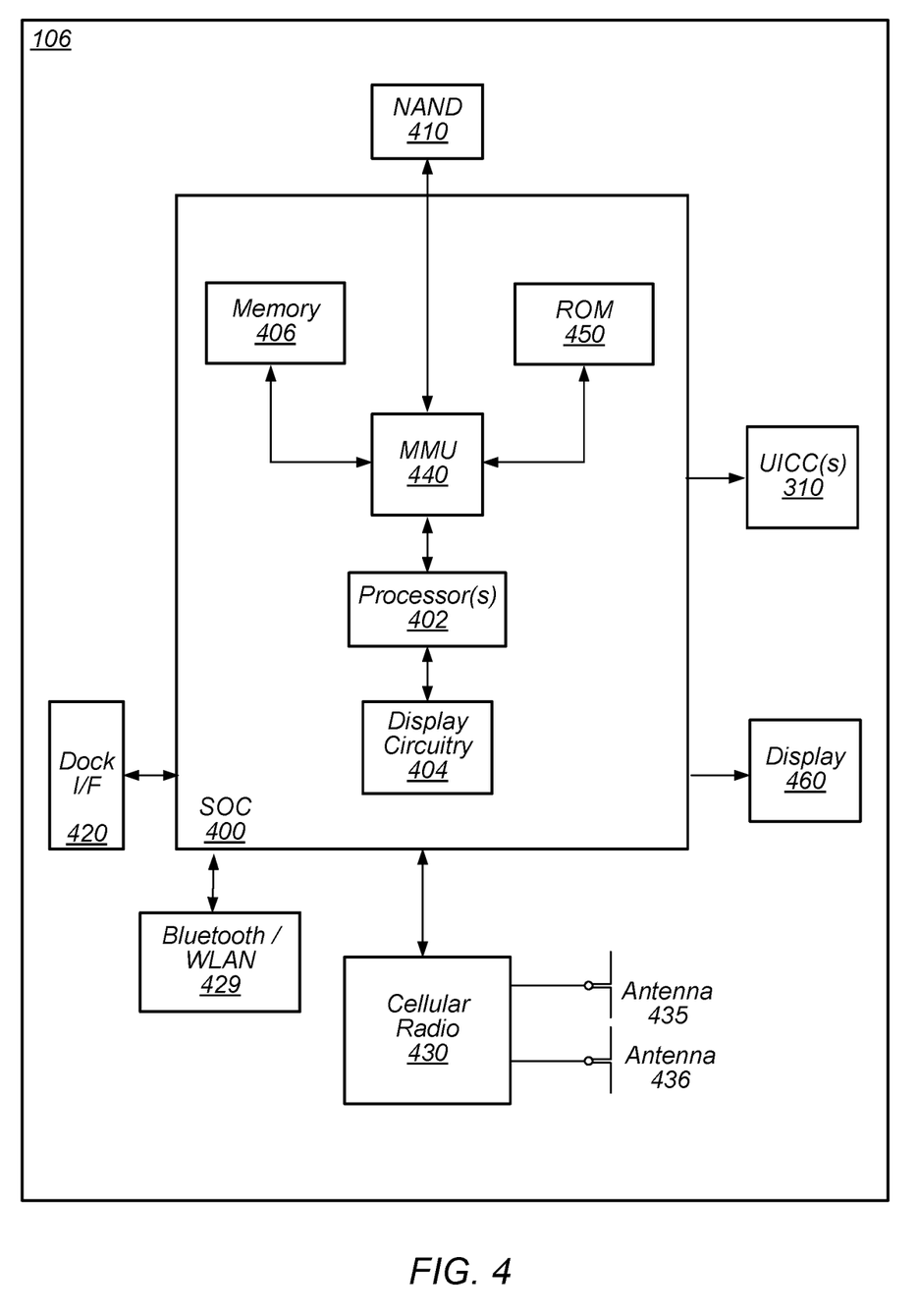
FIG. 4 is an example block diagram of a UE, according to some embodiments.

FIG. 4—User Equipment (UE)

FIG. 4 illustrates an example of a simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including Flash 410), a connector interface 420 (e.g., for coupling to a computer system, dock, charging station, etc.), the display 460, cellular communication circuitry 430 such as for LTE, GSM, TDS, CDMA, etc., and short-range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short-range wireless communication circuitry 429 may also couple to one or both of the antennas 435 and 436 (this connectivity is not shown for ease of illustration).

As shown, the SOC 400 may include processor(s) 402, which may execute program instructions for the UE 106, and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, Flash memory 410) and/or to other circuits or devices, such as the display circuitry 404, cellular communication circuitry 430, short-range wireless communication circuitry 429, connector I/F 420, and/or display 460. The MMU 440 may be configured to perform memory protection and page table translation or set up. In some embodiments, the MMU 440 may be included as a portion of the processor(s) 402. In some embodiments, as noted above, the UE 106 comprises at least one smart card 310, such as a UICC 310, which may execute one or more Subscriber Identity Module (SIM) applications and/or otherwise implement SIM functionality. Various other SIM configurations are also contemplated.

As described herein, the UE 106 may include hardware and/or software components for implementing features for communicating information to a base station this is usable to change a configuration of the base station. The UE may receive aperiodic uplink grants from the base station; the aperiodic uplink grants may be based on a schedule generated by the base station in response to information provided by the UE. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
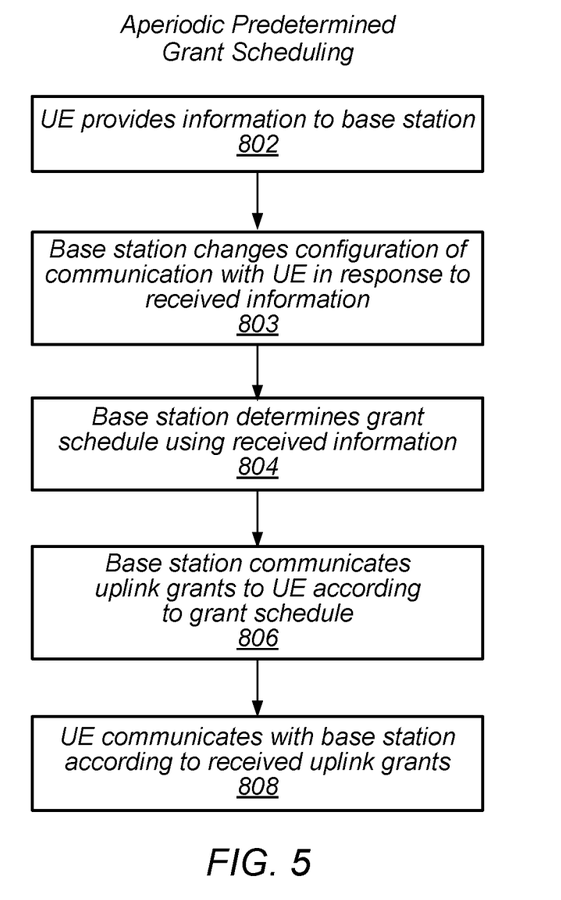
FIG. 5 is an example flowchart illustrating aperiodic predetermined grant scheduling using information provided by the UE to the base station, according to some embodiments.
Figure 6:
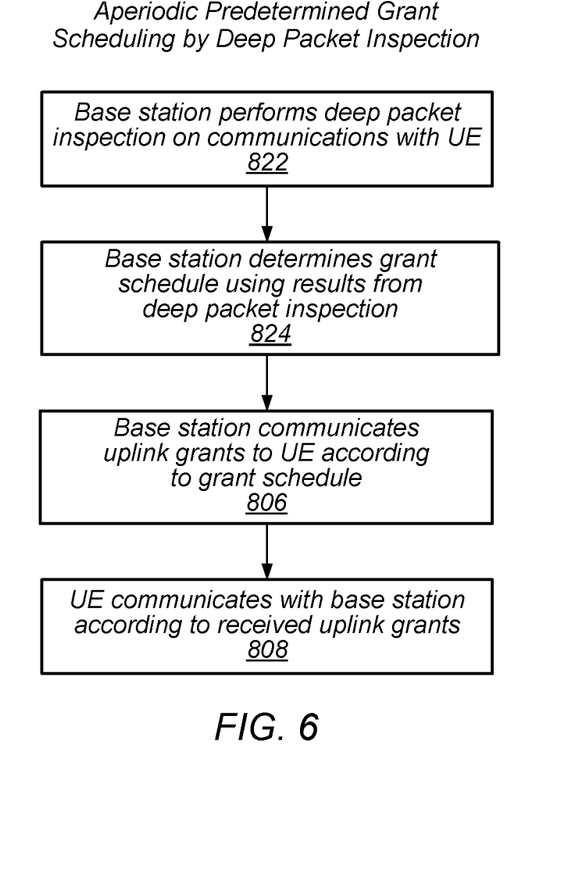
FIG. 6 is an example flowchart illustrating generation by the base station of an aperiodic grant schedule using packet inspection by the base station, according to some embodiments.

FIGS. 5 and 6—Aperiodic Grant Scheduling

FIGS. 5 and 6 illustrate example methods by which a grant schedule for communications between a UE and a base station may be determined and applied.

As shown in step 802 of FIG. 5, the UE may provide information to the base station usable for enabling the base station to determine an aperiodic uplink grant schedule. The information provided by the UE may also be used by the base station for other purposes, such as changing a configuration of the base station. The UE may provide or transmit this information using various techniques, such as by initiating a dedicated bearer establishment procedure with the base station for the purpose of communicating the information to the base station, or by manipulating a power preference indication IE (Information Element). In some implementations, media access layer (MAC) signaling may be used to convey the information to the base station. The information may comprise various forms of data that may factor into the determination of the uplink grant schedule or a change of base station configuration, including one or more of:

(1) numbers of bytes expected to be communicated between the UE and the base station;
(2) expectations of time periodicity of grants, e.g., as a distribution across a time window or as a single periodic value representing the frequency of grants;
(3) expected grant assignment tolerance, e.g., one or more values representing the tolerance of the UE for variations in grant scheduling;

(4) application traffic class indications, e.g., information regarding activity of background application traffic on the UE;
(5) a desired connected mode discontinuous reception (C-DRX) configuration; or
(6) various connection-related parameters, such as last packet indications.

One or more of the above-listed items, and/or other information, may be conveyed to the base station to assist the base station in determining the uplink grant schedule for the UE, which may be aperiodic.

In some embodiments, the information provided to the base station may indicate that the UE desires low power communication, e.g., is link budget limited. At 803, one or more of the above-listed items, and/or other information, may be used by the base station to modify its configuration for subsequent communications with the UE, e.g., to enable the UE to operate with lower power requirements. For example, the base station may change one or more of its C-DRX configuration, measurement thresholds, or RRC and NAS timers in response to information received from the UE.

In some implementations, after the base station receives the information from the UE at 802, the base station may operate to determine an uplink grant schedule, as shown at 804. The base station may use one or more of the above-mentioned pieces of information communicated from the UE to determine the uplink grant schedule.

In some implementations, the information provided by the UE to the base station as shown at 802 may comprise a preferred uplink grant schedule as determined by the UE, e.g., based on the nature of expected communications activity. In these implementations, after the base station receives the information comprising the preferred uplink grant schedule, the base station may apply the received uplink grant schedule or otherwise modify it according to various factors.

In some embodiments, the base station may already contain information regarding ideal or preferred uplink grant schedules of various applications or traffic types. In other words, the base station may be pre-configured with, or have pre-stored, various uplink grant schedules (or communication patterns) for specific communication scenarios or application types. In these embodiments, the information provided to the base station may comprise one or more identifiers corresponding to one of these predetermined grant schedules. This may allow for efficient determination of the uplink grant schedule as the UE may need to communicate less data (e.g., an identifier value rather than a larger amount of information or an entire uplink grant schedule), which the base station can use to determine the appropriate uplink grant schedule.

The uplink grant schedule may be aperiodic (or non-periodic); in other words, uplink grants may not be provided at uniform, periodic, or strictly controlled time intervals. For example, the nature of ongoing background traffic may not necessitate periodic grants at constant intervals. In some embodiments the scheduler in the base station may loosely observe a uniform distribution but allow for some variance in assigning grants to the UE, thus making the uplink grants aperiodic. In other words, the base station scheduler may utilize a periodic uplink grant schedule, and may selectively adjust the actual issuance of the uplink grants, resulting in aperiodic issuance of the uplink grants. In these embodiments, deviation from the uplink grant schedule in the issuance of uplink grants may be limited or controlled by various factors, which may be received from the UE as described above with regard to 802, such as grant assignment tolerance values, e.g., one or more values representing the tolerance of the UE for variations in grant scheduling.

As shown in FIG. 6, steps 822 and 824 illustrate another method by which the base station may determine an uplink grant schedule. The base station may examine communications (e.g., perform packet inspection on packets) with (e.g., from) the UE for the purpose of determining the application or nature of traffic between the base station and the UE. In some embodiments, the base station may perform a deep packet inspection on communications received from the UE. For example, the base station may operate to examine one or more of the port numbers, source addresses, or destination addresses included in uplink packets received from the UE. The base station may process this information and/or other information to determine the uplink grant schedule. For example, the base station may select an uplink grant schedule corresponding to the nature of the traffic as determined by the deep packet inspection. In this method, the UE may not need to send communications to the base station for the purpose of determining the uplink grant schedule. Instead, the base station may use ongoing communications with the UE and predetermined communication patterns to determine the uplink grant schedule. In some scenarios, application traffic with the UE may have been operating by a first grant schedule (which may be periodic) according to SPS or dynamic allocation scheduling, and by the deep packet inspection the base station may determine the new grant schedule (which may be aperiodic), which may result in more efficient subsequent communications.

At 806, after the grant schedule is determined as shown in 804 (FIG. 5) or 824 (FIG. 6), the base station may communicate uplink grants to the UE according to the grant schedule. The base station may provide grants of fixed or variable size to the UE at predetermined time intervals according to the uplink grant schedule. As mentioned above, these time intervals may not be uniform, i.e., the grant schedule may be aperiodic. At 808, the UE may communicate to the base station (i.e., may generate uplink data communications to the base station) according to the uplink grants received at 806. In some embodiments, the UE may not be required to issue scheduling requests for each aperiodic uplink grant, but rather the base station automatically (without UE request) issues or transmits the aperiodic uplink grants to the UE according to the determined aperiodic uplink grant schedule.

In some embodiments, the base station provide the aperiodic uplink grant schedule to the UE, where the aperiodic uplink grant schedule specifies a series (a plurality) of aperiodic uplink grant windows during which the UE is allowed to perform uplink communications. In these embodiments, the UE receives the aperiodic uplink grant schedule and performs uplink communications according to this received schedule. Thus in these embodiments, the receipt of the aperiodic uplink grant schedule allows the UE to automatically perform uplink communications according to the aperiodic grant times indicated in the received schedule, and the UE may not be required to separately receive individual aperiodic grants from the base station (and also may not be required to transmit scheduling requests for these individual grants).

Figure 7A:
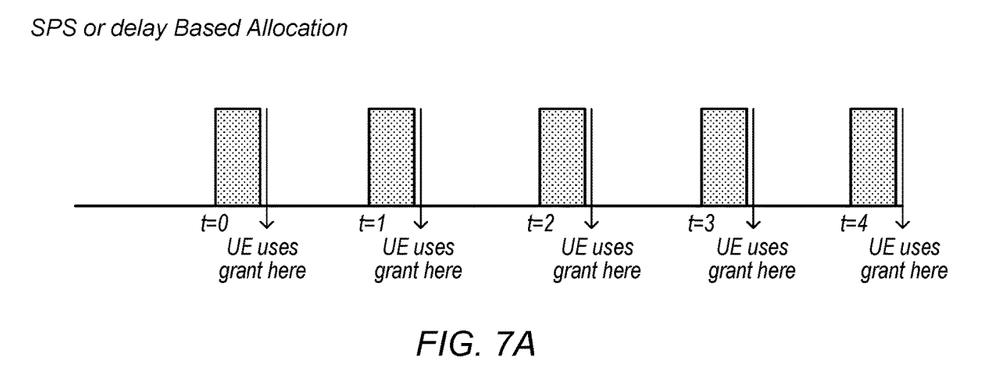
FIG. 7A illustrates an example scenario of communications between a UE and a base station according to SPS/dynamic allocation scheduling according to the prior art.
Figure 7B:
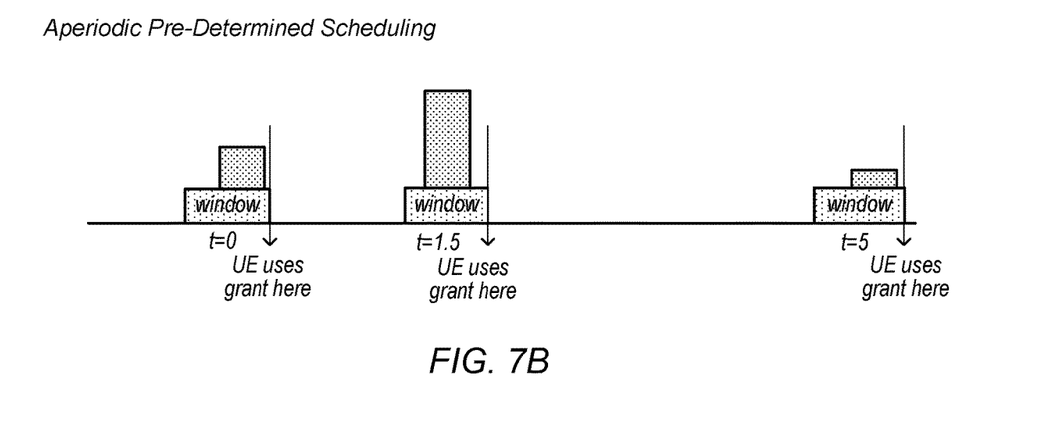
FIG. 7B illustrates an example scenario of communications between a UE and a base station according to aperiodic predetermined scheduling as disclosed herein, according to some embodiments.

FIGS. 7A and 7B—SPS/Dynamic Allocation Grant Scheduling and Aperiodic Predetermined Grant Scheduling FIGS. 7A and 7B illustrate two example scenarios of communications between a UE and a base station. FIG. 7A presents a scenario in which semi-persistent scheduling (SPS) or delay-based allocation is used to determine the timing of uplink grants according to the prior art. In some embodiments of SPS, a quality-of-service flow between the UE and the base station may indicate SPS capability. Current implementations of SPS and delay-based scheduling are typically used to provide continuous grants for applications that require high quality of service or involve delay-bound communications (e.g., interactive voice and video applications). In these scheduling implementations, the base station may issue uplink grants at evenly spaced intervals so that uplink grants are distributed uniformly across a time frame (i.e., periodically). In the example scenario, the UE may transmit uplink data to the base station based on one of these uplink grants, and hence the uplink traffic is transmitted at periodic intervals, when the time value t equals each of 1, 2, 3 and 4 as shown in FIG. 7A. Frequent, periodic grants may sometimes be required in order for the application to remain active and to maintain sufficient quality (e.g., to maintain a real-time call).

FIG. 7B illustrates an example scenario of communications between a UE and a base station in which aperiodic predetermined scheduling is used according to embodiments described herein. The uplink grant schedule may have been determined by the base station through communications between the UE and the base station as described in relation to FIG. 5 above, or through a deep packet inspection as described in relation to FIG. 6 above, or by other techniques. The uplink grant schedule may be aperiodic; in other words, uplink grants may not be provided along uniform or strictly controlled time intervals. As shown in the example scenario, the UE may use an uplink grant when the time value t equals each of 0, 1.5 and 5, etc. FIG. 7B is merely an example, and uplink grants may be issued at any of various times as determined by the base station. These embodiments provide some level of flexibility to the base station and enable more efficient allocation of base station resources. In some embodiments, the time windows may be determined using values conveyed from the UE to the base station at 802 of FIG. 5, e.g., grant assignment tolerance values, which may be based on expected application traffic patterns or requirements.

As noted above, in some embodiments the base station may issue uplink grants to the UE automatically at the aperiodic time frames indicated in the aperiodic uplink grant schedule, without the UE having to separately request each uplink grant. In other embodiments, the base station may simply transmit an aperiodic uplink grant schedule to the UE, and the UE may use this aperiodic uplink grant schedule to initiate uplink communications per this schedule, without requiring a receipt of an individual uplink grant before each aperiodic uplink communication.

Aperiodic uplink grant scheduling may be beneficial in reducing bandwidth and power requirements of the UE and the base station. For example, the nature of background traffic may not necessitate periodic grants along a constant interval. In these cases, aperiodic predetermined scheduling may be used to more efficiently provide uplink grants for less frequent or aperiodic communications or for applications that may not require high quality of service. In contrast, traffic for certain delay-bound applications (e.g., interactive voice and video applications) may utilize more frequent or evenly spaced uplink grants as shown in FIG. 7A.

In some embodiments, predetermined aperiodic scheduling as described herein may be used for special public data networks (PDNs), e.g., background-traffic-only access point names (APNs). In this case, the network may dynamically establish and tear down the PDN related to background communications between the UE and the base station. Though use of these special PDNs may increase traffic on the base station, it may allow for aperiodic uplink grants to be assigned dynamically and efficiently. After the completion of data activity related to the background application, the PDN may be torn down and reassigned when the next duration indicated by the UE is applied. For example, a PDN may be used for different traffic types, e.g., VoLTE, messaging, application updates, background traffic, etc.

The following describes additional embodiments of the invention:

A user equipment device (UE), may comprise: at least one antenna; at least one transmitter coupled to the antenna; at least one receiver coupled to the antenna; and one or more processors coupled to the at least one transmitter and the at least one receiver; wherein the UE is configured to: receive a schedule that specifies aperiodic uplink grants from a base station, wherein the schedule specifies aperiodic grants at non-uniform time intervals; and transmit uplink communications to the base station in response to the received schedule of aperiodic uplink grants, wherein the uplink communications are transmitted at the non-uniform time intervals as specified by the schedule.

In some embodiments of the preceding UE, the UE does not receive individual uplink grants for each of the uplink communications specified by the schedule.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
at least one antenna;
at least one transmitter coupled to the antenna;
at least one receiver coupled to the antenna;
one or more processors coupled to the at least one transmitter and the at least one receiver;
wherein the UE is configured to:
transmit, to a base station, an indication of a tolerance of the UE for variations in uplink grant scheduling;
receive a plurality of aperiodic uplink grants from the base station, wherein respective grants of the plurality of aperiodic uplink grants specify respective aperiodic uplink grant windows during which the UE is allowed to perform uplink communication, wherein the aperiodic uplink grant windows are based on the tolerance of the UE for variations in uplink grant scheduling; and
transmit uplink data communications to the base station in response to the plurality of aperiodic uplink grants, wherein respective uplink communications are transmitted during the respective aperiodic uplink grant windows.

2. The UE of claim 1, wherein the UE is further configured to:
communicate information to the base station, wherein the information is usable by the base station to schedule the aperiodic uplink grant windows.

3. The UE of claim 2,
wherein the information communicated to the base station comprises one or more identifiers, wherein the identifiers correspond with one or more uplink grant schedules stored on the base station.

4. The UE of claim 2, wherein the information communicated to the base station comprises one or more of the following:
(1) numbers of bytes expected to be communicated between the UE and the base station;
(2) expectations of time periodicity of grants; or
(3) application traffic class indications.

5. The UE of claim 2,
wherein the information communicated to the base station is communicated using a dedicated bearer establishment procedure.

6. The UE of claim 2,
wherein the information communicated to the base station is communicated using media access layer (MAC) signaling.

7. The UE of claim 1,
wherein the uplink data communications transmitted to the base station in response to the plurality of aperiodic uplink grants are conveyed using a special public data network, wherein the special public data network is established for conveying the uplink data communications.

8. A base station, comprising:
at least one antenna;
at least one transmitter coupled to the antenna;
at least one receiver coupled to the antenna;
one or more processors coupled to the at least one transmitter and the at least one receiver;
wherein the base station is configured to:
receive information from a user equipment (UE), wherein the information comprises an indication of a tolerance of the UE for variations in uplink grant scheduling;
issue, to the UE, a plurality of aperiodic uplink grants, wherein respective grants of the plurality of aperiodic uplink grants specify respective aperiodic uplink grant windows during which the UE is allowed to perform uplink communication, wherein the aperiodic uplink grant windows are based on the tolerance of the UE for variations in uplink grant scheduling; and
receive uplink data communications from the UE in response to the plurality of aperiodic uplink grants, wherein respective uplink communications are received during the respective aperiodic uplink grant windows.

9. The base station of claim 8, wherein the information received from the UE further comprises one or more of the following:
(1) numbers of bytes expected to be communicated between the UE and the base station;
(2) expectations of time periodicity of grants; or
(3) application traffic class indications.

10. The base station of claim 8,
wherein the information received from the UE further comprises uplink packets; and
wherein the aperiodic uplink grant windows are further based on performing packet inspection on the uplink packets.

11. The base station of claim 10,
wherein the packet inspection comprises examining one or more of port numbers, source addresses, or destination addresses included in uplink packets received from the UE.

12. The base station of claim 8,
wherein the information received from the UE is communicated using a dedicated bearer establishment procedure.

13. The base station of claim 8, wherein the base station is further configured to:
establish a special public data network, wherein the uplink data communications received from the UE in response to the aperiodic uplink grants are conveyed using the special public data network; and
tear down the special public data network upon cessation of the uplink data communications.

14. The base station of claim 8, wherein the base station is further configured to:
modify a communication configuration of the base station for subsequent communications with the UE in response to the information received from the UE.

15. The base station of claim 14,
wherein modifying the communication configuration of the base station comprises modifying one or more of: discontinuous reception configuration, measurement thresholds, or RRC and NAS timers of the base station.

16. An apparatus, comprising:
at least one processing element, wherein the processing element is configured to cause a user equipment (UE) to:
communicate information to a base station, the information comprising an indication of a tolerance of the UE for variations in uplink grant scheduling;
receive a schedule of a plurality of aperiodic uplink grants from the base station, wherein respective grants of the plurality of aperiodic uplink grants specify respective aperiodic uplink grant windows during which the UE is allowed to perform uplink communication, wherein the aperiodic uplink grant windows are based on the tolerance of the UE for variations in uplink grant scheduling; and
generate uplink data communications to the base station in response to the plurality of aperiodic uplink grants, wherein respective uplink communications are transmitted during the respective aperiodic uplink grant windows.

17. The apparatus of claim 16,
wherein the information communicated to the base station is communicated using media access layer (MAC) signaling.

18. The apparatus of claim 16,
wherein the information communicated to the base station further comprises a power preference indication information element.

19. The apparatus of claim 16, wherein the information communicated to the base station further comprises a number of bytes expected to be communicated between the UE and the base station.

20. The apparatus of claim 16, wherein the information communicated to the base station further comprises an expected time periodicity of grants.

* * * * *